(12) United States Patent
Higashihara

(10) Patent No.: US 10,703,236 B2
(45) Date of Patent: Jul. 7, 2020

(54) VEHICLE SEAT

(71) Applicant: TOYOTA JIDOSHA KABUSHIKI KAISHA, Toyota-shi, Aichi-ken (JP)

(72) Inventor: Shota Higashihara, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 15/837,570

(22) Filed: Dec. 11, 2017

(65) Prior Publication Data

US 2018/0222364 A1    Aug. 9, 2018

(30) Foreign Application Priority Data

Feb. 8, 2017   (JP) ................................ 2017-021566

(51) Int. Cl.
*B60N 2/56*   (2006.01)
*B60N 2/64*   (2006.01)

(52) U.S. Cl.
CPC ............... *B60N 2/565* (2013.01); *B60N 2/64* (2013.01)

(58) Field of Classification Search
None
See application file for complete search history.

(56) References Cited

U.S. PATENT DOCUMENTS

| 7,467,823 | B2 * | 12/2008 | Hartwich ........... B60H 1/00285 297/180.14 |
| 8,820,829 | B2 * | 9/2014 | Uebelacker .......... B60N 2/5642 297/180.13 |
| 2006/0197363 | A1 * | 9/2006 | Lofy .................... B60N 2/5628 297/180.13 |
| 2017/0028886 | A1 * | 2/2017 | Zhang .................... B60N 2/565 |

FOREIGN PATENT DOCUMENTS

| JP | 2013-011035 A | 1/2013 |
| JP | 2015-217776 A | 12/2015 |
| JP | 2016-132350 A | 7/2016 |

* cited by examiner

*Primary Examiner* — Kristina N Junge
(74) *Attorney, Agent, or Firm* — Oliff PLC

(57) ABSTRACT

There is provided a vehicle seat including: a seatback; a seat cushion; an airflow generating device that generates a difference in pressure between a supporting surface side and a side opposite the supporting surface, and that generates an airflow; and a cushion layer that is provided at, of the seatback or the seat cushion, a side at which the airflow generating device is disposed, and that structures a portion of the supporting surface side, and that is structured to include a main air permeable portion that is set to a predetermined void ratio and through which a majority of the airflow generated by the airflow generating device passes, and an auxiliary air permeable portion, which is set to a void ratio that is lower than that of the main air permeable portion and whose air permeability is lower than that of the main air permeable portion.

8 Claims, 7 Drawing Sheets

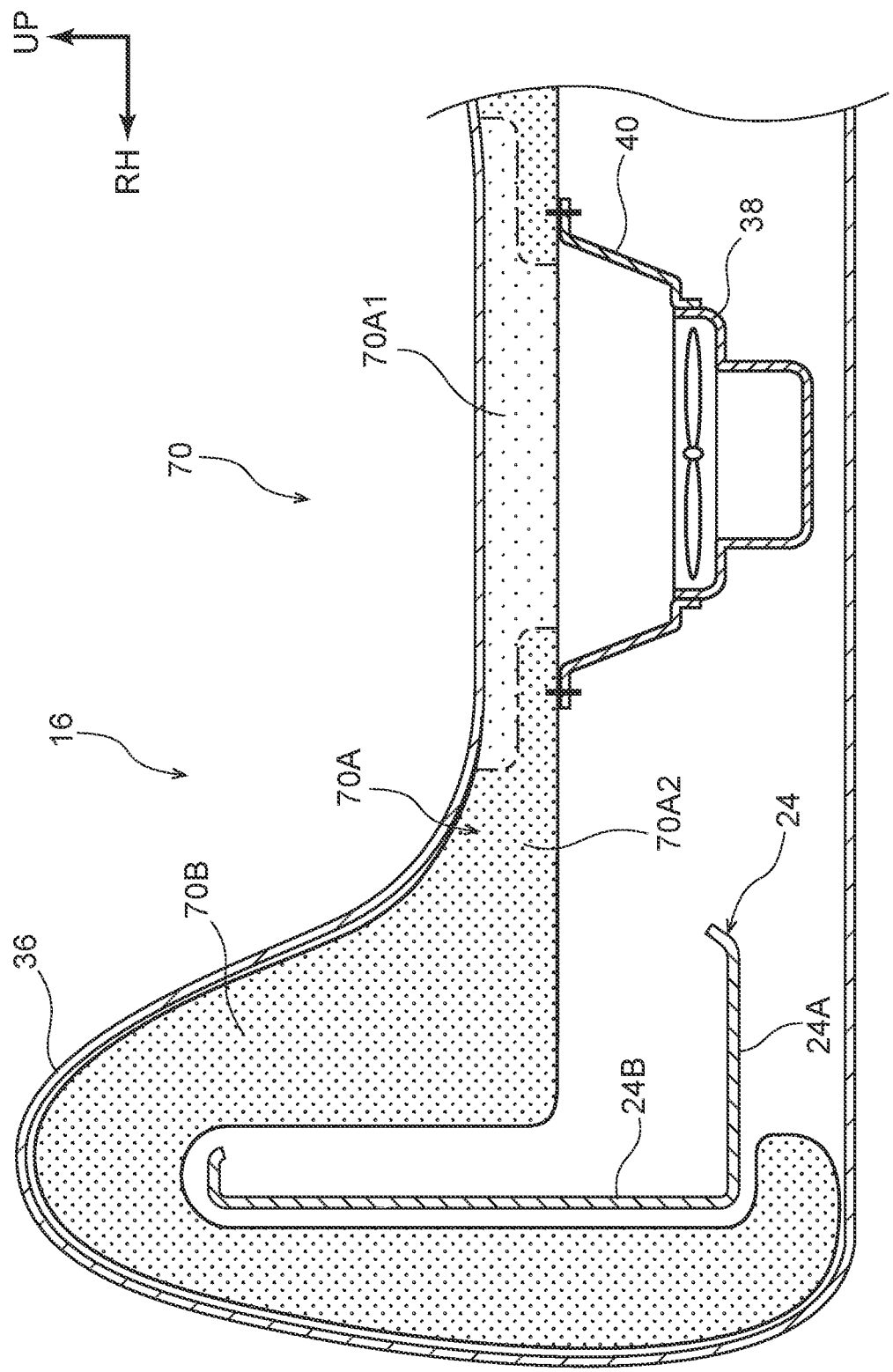

VEHICLE SEAT

CROSS-REFERENCE TO RELATED APPLICATION

This application is based on and claims priority under 35 USC 119 from Japanese Patent Application No. 2017-021566 filed on Feb. 8, 2017, the disclosure of which is incorporated by reference herein.

BACKGROUND

Technical Field

The present disclosure relates to a vehicle seat.

Related Art

Japanese Patent Application Laid-Open (JP-A) No. 2015-217776 discloses a disclosure relating to a seat for a vehicle. In this seat for a vehicle, a recess is formed in the rear surface side of a back pad that structures a portion of a seatback. An air blowing device is disposed at the inner side of the recess. Further, vent holes that communicate the recess and the surface of that supports a vehicle occupant are formed in the back pad. The airflow that is sent-out from the air blowing device is blown-out toward the back portion of the vehicle occupant via the vent holes.

However, in JP-A No. 2015-217776, because the airflow is blown-out uniformly from the plural vent holes, the airflow is blown uniformly against every region of the back portion of the vehicle occupant.

Namely, there is room for improvement in the above-described related art with regard to the point of varying the flow volume of the airflow that is directed toward the vehicle occupant, in accordance with the region of the body of the vehicle occupant.

SUMMARY

In view of the above-described circumstances, the present disclosure provides a vehicle seat that can vary the flow volume of the airflow that is directed toward a vehicle occupant, in accordance with the region of the body of the vehicle occupant.

A vehicle seat of a first aspect of the present disclosure includes: a seatback that supports a back portion of a vehicle occupant; a seat cushion that supports buttocks and femoral regions of the vehicle occupant; an airflow generating device that is disposed at an interior of at least one of the seatback or the seat cushion, and that generates a difference in pressure between a supporting surface side, which supports the vehicle occupant, and a side opposite the supporting surface, and that generates an airflow; and a cushion layer that is provided at, of the seatback or the seat cushion, a side at which the airflow generating device is disposed, and that structures a portion of the supporting surface side at the side at which the airflow generating device is disposed, and that is structured to include a main air permeable portion, which is set to a predetermined void ratio and through which a majority of the airflow generated by the airflow generating device passes, and an auxiliary air permeable portion that is set to a void ratio that is lower than that of the main air permeable portion and whose air permeability is lower than that of the main air permeable portion.

In accordance with the first aspect of the present disclosure, the vehicle seat has the seatback that supports the back portion of the vehicle occupant, and the seat cushion that supports the buttocks and the femoral regions of the vehicle occupant. The airflow generating device is disposed at the interior of at least one of these. Further, at the side at which the airflow generating device is disposed among the seatback and the seat cushion, the airflow generating device generates a difference in pressure between the supporting surface that supports the vehicle occupant and the side opposite the supporting surface, and can generate an airflow. Moreover, the cushion layer, which structures a portion of the supporting surface side, is provided at the side at which the airflow generating device is disposed among the seatback and the seat cushion. The airflow that is generated by the airflow generating device can pass-through the cushion layer. Therefore, in the present disclosure, the airflow can be made to flow toward the body of the vehicle occupant.

By the way, the body of the vehicle occupant has regions where it is preferable for the flow volume of the airflow that flows theretoward to be high, and, on the other hand, has regions where it is preferable for the flow volume to be low. It is thought that the flow volumes that are desirable differ in accordance with the regions of the body of the vehicle occupant.

Here, in the present disclosure, the cushion layer is structured to include the main air permeable portion that is set to a predetermined void ratio and through which the majority of the airflow generated by the air intake device is transmitted, and the auxiliary air permeable portion that is set to a void ratio lower than that of the main air permeable portion and whose air permeability is lower than that of the main air permeable portion. Note that air permeability here means the air permeability measured by a Frazier Permeability Tester, or the air passage resistance evaluated by a KES Air Permeability Tester. Therefore, in the present disclosure, by disposing the main air permeable portion at a position adjacent to a region of the body of the vehicle occupant where a greater flow volume of the airflow that flows theretoward is preferable, the flow volume of the airflow that is directed toward this region can be made to be large. On the other hand, by disposing the auxiliary air permeable portion at a position adjacent to a region of the body of the vehicle occupant where a lower flow volume of the airflow that flows theretoward is preferable, the flow volume of the airflow that is directed toward this region can be made to be small.

In a vehicle seat of a second aspect of the present disclosure, in the first aspect, the cushion layer is supported by a fabric spring member that spans between a pair of frame members that structure portions of a frame at a side at which the cushion layer is provided, of the seatback or the seat cushion, and the fabric spring member has air permeability that is equivalent to, or higher than, that of the main air permeable portion.

In accordance with the second aspect of the present disclosure, a portion of the frame at the side at which the cushion layer is provided among the seatback and the seat cushion is structured by the pair of frame members. The fabric spring member spans between these frame members. Further, the cushion layer is supported by the fabric spring member. Therefore, in the present disclosure, even if the cushion layer is made to be thin, the vehicle occupant can be supported by the fabric spring member, and, as a result, storage of heat at the cushion layer can be suppressed. Moreover, because the fabric spring member has air permeability that is equivalent to or greater than that of the main air permeable portion, the fabric spring member acting as resistance to the airflow that is generated at the airflow generating device can be suppressed.

In a vehicle seat of a third aspect of the present disclosure, in the first aspect, the cushion layer is structured by a urethane foam that can support the vehicle occupant and that has been subjected to a film removing treatment.

In accordance with the third aspect of the present disclosure, the cushion layer is structured by a urethane foam that has been subjected to a film removing treatment. The vehicle occupant can be supported by the cushion layer, and the storage of heat at the cushion layer can be suppressed. Note that film removing treatment here means a treatment that makes it easy for air and water to pass-through by removing the thin film that structures portions of the voids of the urethane foam.

In a vehicle seat of a fourth aspect of the present disclosure, in any one of the first through the third aspects, the airflow generating device is an air intake device that draws air in from the supporting surface side to the side opposite the supporting surface.

In accordance with the fourth aspect of the present disclosure, an airflow that flows from the supporting surface side of the seatback or the seat cushion toward the side opposite the supporting surface can be generated by the air intake device.

By the way, because the body temperature of the vehicle occupant is transmitted to the seatback and the seat cushion, there is the tendency for the temperatures thereof to become higher than the temperature of the air within the vehicle cabin. In a case in which the cooling unit is operated or the like, this tendency becomes more marked. Accordingly, in cooling the vehicle occupant, it is more preferable to use the air within the vehicle cabin than the air that passes-through the seatback and the seat cushion.

Further, in the present disclosure, the airflow that is generated by the air intake device flows from the supporting surface side of the seatback or the seat cushion toward the side opposite this supporting surface. Therefore, at the periphery of the vehicle occupant, the air within the vehicle cabin flows in a vicinity of the vehicle occupant without passing-through the seatback or the seat cushion.

In a vehicle seat of a fifth aspect of the present disclosure, in any one of the first through fourth aspects, the seat cushion has a first cushion layer that is provided at the seatback and a second cushion layer that is provided at the seat cushion, a seat upper side portion of the first cushion layer is structured by the main air permeable portion, and a seat lower side portion of the first cushion layer is structured by the auxiliary air permeable portion, and a seat front side portion of the second cushion layer is structured by the main air permeable portion, and a seat rear side portion of the second cushion layer is structured by the auxiliary air permeable portion.

In accordance with the fifth aspect of the present disclosure, the cushion layer has the first cushion layer that is provided at the seatback and the second cushion layer that is provided at the seat cushion, and the airflow can be made to flow toward the back portion, the buttocks and the femoral regions of the vehicle occupant. Therefore, the back portion, the buttocks, and the femoral regions of the vehicle occupant can be cooled by the airflow that is generated by the airflow generating device.

By the way, nerves are concentrated at the lumbar region of a human body, and it is not preferable for the lumbar region of the vehicle occupant to be cooled excessively by the airflow generated by the airflow generating device.

Here, in the present disclosure, at the first cushion layer, the seat upper side portion thereof is structured by the main air permeable portion, and the seat lower side portion thereof is structured by the auxiliary air permeable portion. On the other hand, at the second cushion layer, the seat front side portion thereof is structured by the main air permeable portion, and the seat rear side portion thereof is structured by the auxiliary air permeable portion. Therefore, in the present disclosure, the flow volume of the airflow that flows toward the lumbar region of the vehicle occupant can be made to be small.

In a vehicle seat of a sixth aspect of the present disclosure, in the fourth aspect, the air intake device is connected to the cushion layer via a duct, and, as seen from the supporting surface side, a portion, which overlaps the duct, of the cushion layer is structured by the main air permeable portion, and a portion, which is at the periphery of the main air permeable portion, of the cushion layer is structured by the auxiliary air permeable portion.

In accordance with the sixth aspect of the present disclosure, the air intake device is connected to the cushion layer via the duct. The airflow, which flows from the supporting surface side of the seatback or the seat cushion toward the air intake device, is sucked through the duct into the air intake device.

By the way, depending on the structure of the cushion layer, it is thought that the air that has passed-through the seatback or the seat cushion will flow toward the vehicle occupant. Concretely, there is the example of a case in which, as seen from the supporting surface side of the seatback or the seat cushion, the air permeability of the portion of the cushion layer which portion overlaps the duct is equivalent to or lower than the air permeability of the portion of the cushion layer which portion is at the periphery of the duct. In this case, it is thought that the air that has passed-through the seatback or the seat cushion will circle-around to the supporting surface side and will be sucked-in to the duct side.

Here, in the present disclosure, as seen from the supporting surface side of the seatback or the seat cushion, the portion of the cushion layer which portion overlaps the duct is structured by the main air permeable portion, and the portion of the cushion layer which portion is at the periphery of the main air permeable portion is structured by the auxiliary air permeable portion. Therefore, in the present disclosure, it is easy for the air within the vehicle cabin to be sucked-in from the duct, and air that has passed-through the seatback or the seat cushion being sucked into the duct can be suppressed.

As described above, the vehicle seat of the first aspect of the present disclosure has the excellent effect of being able to, in accordance with the region of the body of a vehicle occupant, vary the flow volume of the airflow that is directed toward the vehicle occupant.

The vehicle seat of the second aspect of the present disclosure has the excellent effect that a rise in temperature of the cushion layer can be suppressed.

The vehicle seat of the third aspect of the present disclosure has the excellent effect that a rise in temperature of the cushion layer can be suppressed while an increase in the number of parts is suppressed.

The vehicle seat of the fourth aspect of the present disclosure has the excellent effect that the vehicle occupant can be cooled efficiently.

The vehicle seat of the fifth aspect of the present disclosure has the excellent effect that the back portion, the buttocks and the femoral regions of a vehicle occupant can be cooled with the vehicle occupant being in a comfortable state.

The vehicle seat of the sixth aspect of the present disclosure has the excellent effect that the reliability of low-temperature air flowing toward the vehicle occupant can be improved.

BRIEF DESCRIPTION OF DRAWINGS

Exemplary embodiments of the present disclosure will be described in detail based on the following figures, wherein:

FIG. 7 is a cross-sectional view that is seen from the seat front-rear direction and shows the structure of a seat cushion of a vehicle seat relating to a fourth embodiment.

DETAILED DESCRIPTION

First Embodiment

Figure 1:
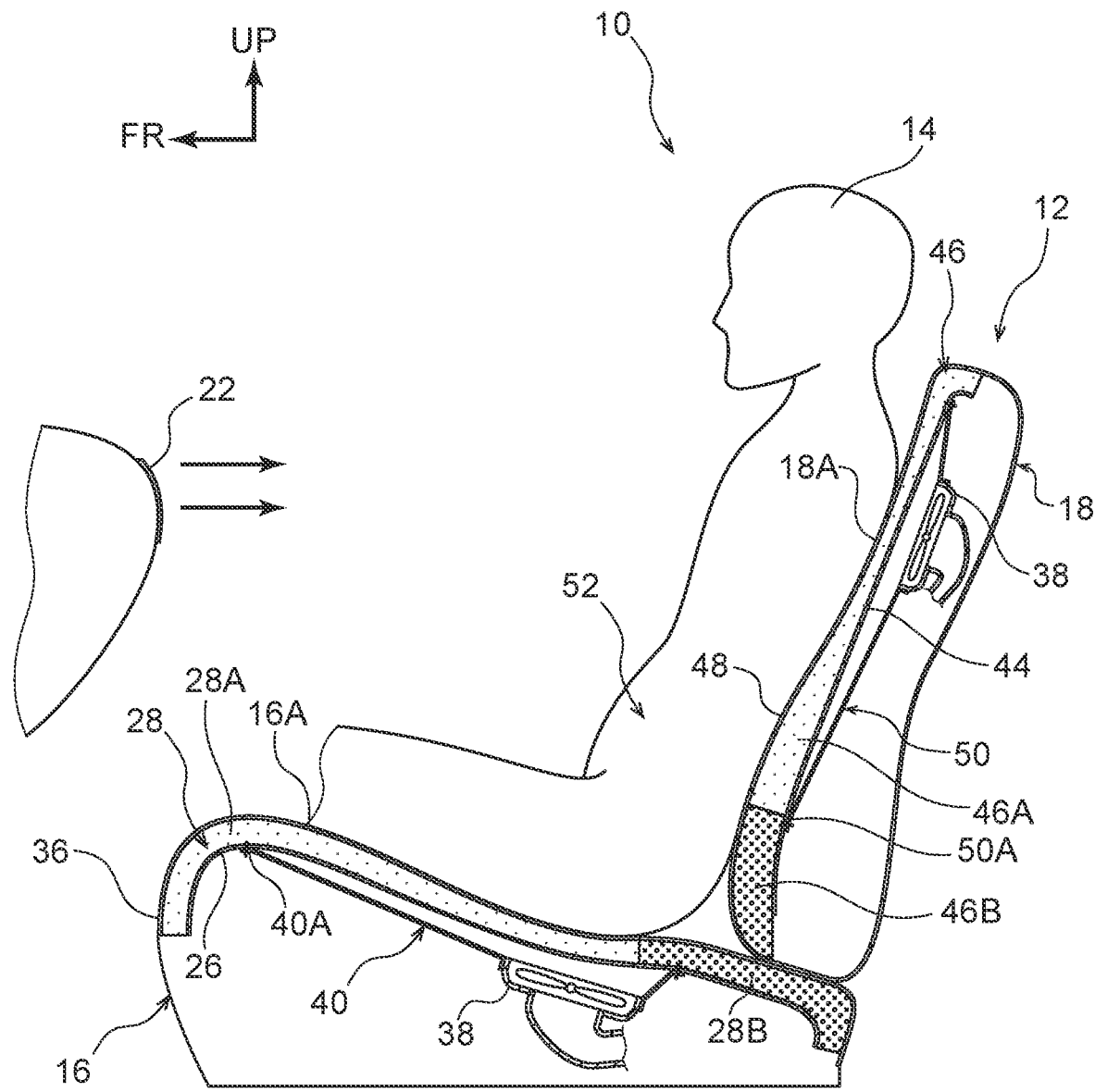
FIG. 1 is a cross-sectional view in which the structure of a vehicle seat relating to a first embodiment is seen from a seat transverse direction (a cross-sectional view showing the state cut along line 1-1 of FIG. 3)

A first embodiment of a vehicle seat relating to the present disclosure is described hereinafter by using FIG. 1 through FIG. 3. Note that arrow FR, arrow UP and arrow RH that are shown appropriately in the respective drawings respectively indicate the frontward direction, the upward direction and the rightward direction of a "vehicle seat 10" (hereinafter called seat 10) relating to the present embodiment. Further, in the present embodiment, the frontward direction, the upward direction and the rightward direction of the seat 10 coincide with the frontward direction, the upward direction and the rightward direction of the vehicle in which the seat 10 is installed.

First, the structure of a seat main body 12 that structures the basic portion of the vehicle seat 10 is described. As shown in FIG. 1 and FIG. 3, the seat main body 12 is structured to include a "seat cushion 16" that supports the buttocks and the femoral regions of a vehicle occupant 14, a "seatback 18" that supports the back portion of the vehicle occupant 14, and a headrest 20 (not illustrated in FIG. 1) that supports the head portion of the vehicle occupant 14. The headrest 20 is supported at the seat upper side end portion of the seatback 18 so as to be able to move up and down. The seatback 18 is tiltably supported at the seat rear side end portion of the seat cushion 16.

Note that the vehicle seat 10 is a front seat that is installed in the vehicle front side of the cabin interior of the vehicle. Further, in the present embodiment, the outline of the vehicle occupant 14 that is shown in the respective drawings is shown as the outline of a dummy (an AM 50) that is in a state of being seated in the seat 10 in a predetermined seated posture (a standard posture). A blow-out port 22 for air conditioning is disposed at the vehicle front side of the seat main body 12.

Figure 2:
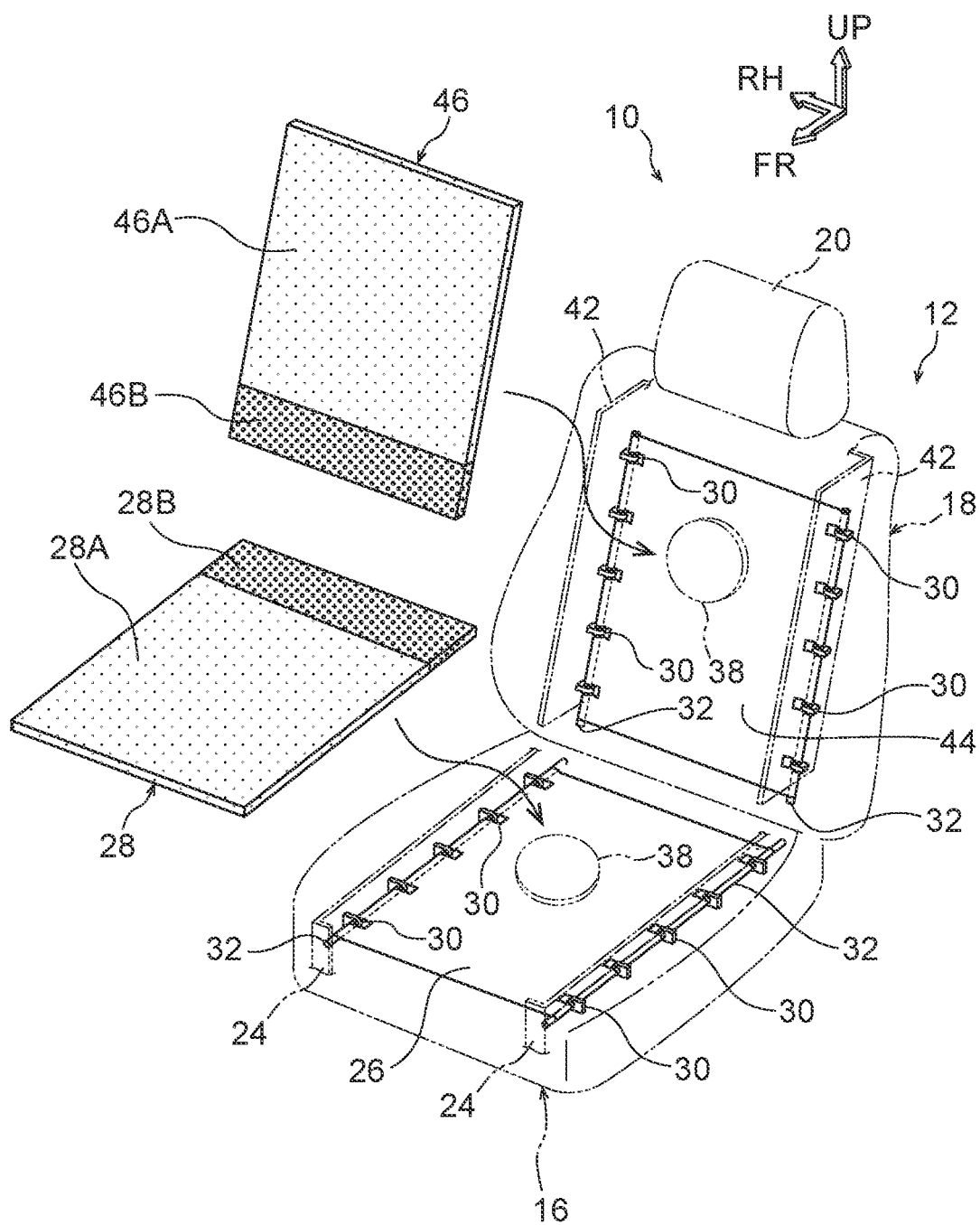
FIG. 2 is a perspective view showing the structure of main portions of the vehicle seat relating to the first embodiment.
Figure 3:
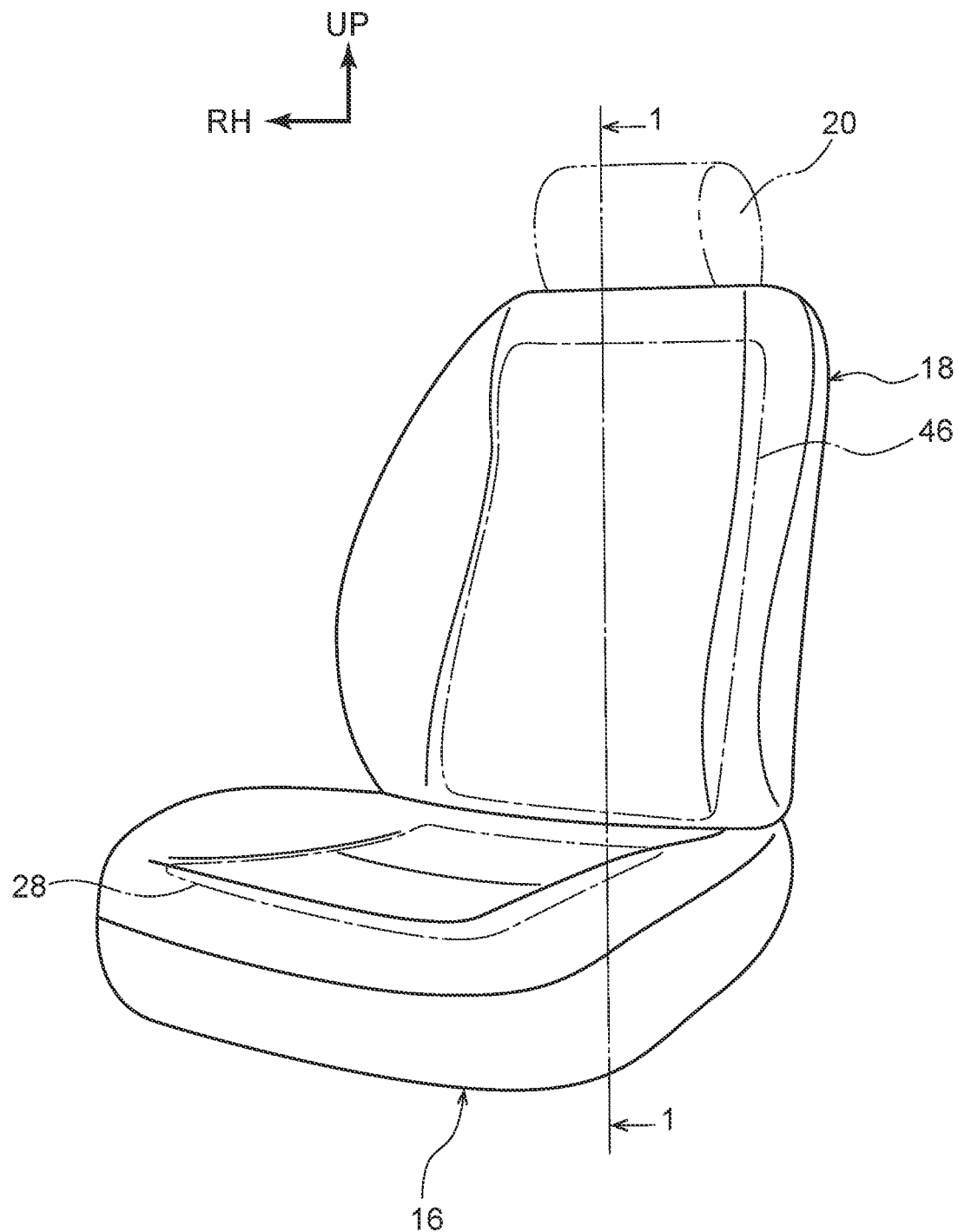
FIG. 3 is a perspective view showing the overall structure of the vehicle seat relating to the first embodiment.

In detail, as shown in FIG. 1 and FIG. 2, the seat cushion 16 has "cushion side frames 24" that serve as a pair of frame members that structure the frame of the seat cushion 16, a "fabric spring member 26", and a "slab 28" that serves as a second cushion layer.

The cushion side frames 24 are made of metal, and are disposed at the seat transverse direction both side end portions of the seat cushion 16 respectively, and extend in the seat front-rear direction. As shown also in FIG. 6 that is used in explaining the third embodiment that is described later, the cushion side frame 24 is structured to include a bottom wall portion 24A that structures the seat lower side portion of the cushion side frame 24, and a side wall portion 24B that structures the seat transverse direction outer side portion of the cushion side frame 24. As seen from the seat vertical direction, the bottom wall portion 24A is shaped as a plate that is rectangular and extends in the seat front-rear direction. As seen from the seat transverse direction, the side wall portion 24B is shaped as a plate that is rectangular and extends in the seat front-rear direction.

Further, plural mounting brackets 30 are provided at a predetermined interval in the seat front-rear direction at the side wall portions 24B of the cushion side frames 24. Unillustrated insert-through portions that respectively run along the seat front-rear direction are formed in the mounting brackets 30. Wires 32 are respectively inserted-through these insert-through portions in the seat front-rear direction. The wires 32 are in a state of bridging between the plural brackets 30. Note that the seat upper sides and the seat transverse direction outer sides of the cushion side frames 24 are covered by seat pads 34 that are structured of a foam resin such as urethane foam or the like. The bulging portions at the seat transverse direction outer sides of the seat cushion 16 are structured by these seat pads 34. Further, the surface of the seat cushion 16 is structured by a skin material 36.

On the other hand, the fabric spring member 26 is formed of an elastic fabric material such as an elastic woven fabric or the like, and, as seen from the seat vertical direction, is a rectangular shape that extends in the seat front-rear direction and the seat transverse direction. Further, annular portions 26A are provided at the seat transverse direction both side end portions of the fabric spring member 26 due to these end portions being folded-over and sewn-together. The fabric spring member 26 is mounted to the cushion side frames 24 due to the wires 32 being inserted-through these annular portions 26A. Namely, the fabric spring member 26 is in a state of spanning between the pair of wires 32. This can also be considered as the fabric spring member 26 spanning between the cushion side frames 24. Further, the slab 28 is disposed at the seat upper side of the fabric spring member 26 as will be described later, and the slab 28 structures a portion of a "supporting surface 16A" side that supports the vehicle occupant 14 at the seat cushion 16.

An "air intake device 38" that serves as an airflow generating device is disposed at the interior of the seat cushion 16 that is structured as described above. The air intake device 38 generates a difference in air pressures at the supporting surface 16A side of the seat cushion 16 and the side opposite the supporting surface 16A, and can draw air in from the supporting surface 16A side to the side opposite the supporting surface 16A (the seat lower side). Note that the air intake device 38 is supported at the cushion side frames 24 via unillustrated supporting brackets. Further, the air intake device 38 is connected to the fabric spring member 26 via a "duct 40".

The duct 40 is structured of an elastically deformable resin material, and is shaped as an angular tube whose cross-section becomes larger from the seat lower side toward the seat upper side. As seen from the seat vertical direction, the duct 40 is a size that is sufficient to cover the range from the backs of the knees to the tailbone of the vehicle occupant 14. A peripheral edge portion 40A at the seat upper side of the duct 40 is attached to the fabric spring member 26 and the slab 28 by sewing or the like. Note that the peripheral edge portion 40A of the duct 40 may be set in a state of abutting the fabric spring member 26, in a state of not being sewn to the fabric spring member 26. Further, the exhaust portion of the air intake device 38 extends-out to the seat rear side of the seat 10.

On the other hand, the seatback 18 includes "back side frames 42" that serve as a pair of frame members that structure the frame of the seatback 18, a "fabric spring member 44", and a "slab 46" that serves as a first cushion layer. The seatback 18 is basically structured similarly to the seat cushion 16.

Namely, the fabric spring member 44 is attached to the back side frames 42 by the mounting brackets 30 and the wires 32. The slab 46 is disposed at the seat front side of the fabric spring member 44 as is described later. The slab 46 structures a portion of a "supporting surface 18A" side that supports the vehicle occupant 14 at the seatback 18. Note that, in the same way as the cushion side frames 24, the back side frames 42 are covered by unillustrated seat pads. Further, the surface of the seatback 18 is structured by a skin material 48.

The air intake device 38 is disposed also at the interior of the seatback 18, and can draw air in from the supporting surface 18A side of the seatback 18 to the side opposite the supporting surface 18A (the seat rear side). Further, a "duct 50" that connects the air intake device 38 and the fabric spring member 44 is structured of an elastically deformable resin material, and is the shape of an annular pillar whose cross-section becomes larger from the seat rear side toward the seat front side. The duct 50 is sufficiently large to cover from the base of the neck to the sacrum of the vehicle occupant 14 as seen from the seat front-rear direction. The processing of a peripheral edge portion 50A that is at the seat front side of the duct 50 is similar to that of the peripheral edge portion 40A of the duct 40. Note that the exhaust portion of the air intake device 38 at the seatback 18 as well extends-out to the seat rear side of the seat 10.

Here, the present embodiment has features in the structures of the slab 28, which is disposed at the seat upper side of the fabric spring member 26 at the seat cushion 16, and the slab 46, which is disposed at the seat front side of the fabric spring member 44 at the seatback 18. The structures of the slabs 28, 46 that structure main portions of the present embodiment are described in detail hereinafter.

First, the structure of the slab 28 is described by using FIG. 1 and FIG. 2. The slab 28 is structured of a urethane foam whose void ratio is higher than and that is softer than the material that structures the seat pads 34. As seen from the seat vertical direction, the slab 28 is the shape of a sheet that is rectangular and that extends in the seat front-rear direction and the seat transverse direction.

In further detail, by varying the void ratio at the seat front side portion of the slab 28 and the seat rear side portion thereof, the slab 28 is structured to include a "high air permeability portion 28A" that serves as a main air permeable portion, and a "low air permeability portion 28B" that serves as an auxiliary air permeable portion. The high air permeability portion 28A is set to a predetermined void ratio, and is structured by the portion that has a high void ratio at the slab 28, and takes up the portion of the slab 28 that is approximately 70% to 80% from the seat front side thereof. Therefore, although the airflow that is generated by the air intake device 38 can pass-through the slab 28 on the whole, the majority of this airflow passes-through the high air permeability portion 28A.

On the other hand, the low air permeability portion 28B structures the portion that is further toward the seat rear side than the high air permeability portion 28A of the slab 28, and is structured by the portion that has a low void ratio at the slab 28, and the air permeability is lower than that of the high air permeability portion 28A. Note that the air permeability here means the air permeability measured by a Frazier Permeability Tester, or the air passage resistance evaluated by a KES Air Permeability Tester.

By varying the void ratio at the seat upper side portion of the slab 46 and the seat lower side portion thereof, the slab 46 is structured to include a "high air permeability portion 46A" that serves as a main air permeable portion, and a "low air permeability portion 46B" that serves as an auxiliary air permeable portion. The high air permeability portion 46A is structured by the portion that has a high void ratio at the slab 46, and takes up the portion of the slab 46 that is approximately 70% to 80% from the seat upper side thereof. Therefore, although the airflow that is generated by the air intake device 38 can pass-through the slab 46 on the whole, the majority of this airflow passes-through the high air permeability portion 46A.

On the other hand, the low air permeability portion 46B structures the portion that is further toward the seat lower side than the high air permeability portion 46A of the slab 46, and is structured by the portion that has a low void ratio at the slab 46, and the air permeability is lower than that of the high air permeability portion 46A. Note that the above-described fabric spring members 26, 44 and skin materials 36, 48 have air permeabilities that are equivalent to or better than those of the high air permeability portions 28A, 46A, and do not act as resistance to the airflows that are generated at the air intake devices 38. Further, in the present embodiment, as described above, the slab 28 is provided at the seat cushion 16, and the slab 46 is provided at the seatback 18. It can also be considered that a "cushion layer 52" of the seat main body 12 is structured by these.

Operation and Effects of Present Embodiment

Operation and effects of the present embodiment are described next.

In the present embodiment, as shown in FIG. 1, the vehicle seat 10 has the seatback 18 that supports the back portion of the vehicle occupant 14, and the seat cushion 16 that supports the buttocks and the femoral regions of the vehicle occupant 14. The air intake devices 38 are disposed at the interiors of the seatback 18 and the seat cushion 16. Further, at the seatback 18 and the seat cushion 16, the air intake devices 38 generate pressure differences between the supporting surfaces 16A, 18A that support the vehicle occupant 14 and the sides opposite these supporting surfaces 16A, 18A, and can generate airflows. Moreover, the slabs 28, 46 that structure portions of the supporting surface 16A, 18A sides respectively are provided at the seatback 18 and the seat cushion 16. The airflows that are generated by the air intake devices 38 can pass-through the slabs 28, 46.

Therefore, in the present embodiment, airflows can be made to flow toward the body of the vehicle occupant 14.

By the way, the body of the vehicle occupant 14 has regions where it is preferable for the flow volume of the airflow that flows theretoward to be high, and, on the other hand, has regions where it is preferable for the flow volume to be low. It can be thought that the flow volumes that are desirable differ in accordance with the regions of the body of the vehicle occupant 14.

Here, in the present embodiment, the slab 28 is structured to include the high air permeability portion 28A through which the majority of the airflow generated by the air intake device 38 is transmitted, and the low air permeability portion 28B whose air permeability is lower than that of the high air permeability portion 28A. On the other hand, the slab 46 as well is structured to include the high air permeability portion 46A through which the majority of the airflow generated by the air intake device 38 is transmitted, and the low air permeability portion 46B whose air permeability is lower than that of the high air permeability portion 46A. Therefore, in the present embodiment, by disposing the high air permeability portions 28A, 46A at positions adjacent to the regions of the body of the vehicle occupant 14 where a greater flow volume of the airflow that flows theretoward is preferable, the flow volumes of the airflows that are directed toward these regions can be made to be large. On the other hand, by disposing the low air permeability portions 28B, 46B at positions adjacent to the regions of the body of the vehicle occupant 14 where a lower flow volume of the airflow that flows theretoward is preferable, the flow volumes of the airflows that are directed toward these regions can be made to be small. Accordingly, in the present embodiment, the flow volume of the airflow that is directed toward the vehicle occupant 14 can be varied in accordance with the region of the body of the vehicle occupant 14.

Further, in the present embodiment, as shown in FIG. 2, portions of the frame of the seat cushion 16 are structured by the pair of cushion side frames 24, and the fabric spring member 26 spans therebetween. On the other hand, at the seatback 18, portions of the frame thereof are structured by the pair of back side frames 42, and the fabric spring member 44 spans therebetween. Further, the slab 28 is supported by the fabric spring member 26, and the slab 46 is supported by the fabric spring member 44. Therefore, in the present embodiment, even if the slabs 28, 46 are made to be thin, the vehicle occupant 14 can be supported by the fabric spring members 26, 44, and, as a result, storage of heat at the slabs 28, 46 can be suppressed. Moreover, because the fabric spring members 26, 44 have air permeabilities that are equivalent to or better than those of the high air permeability portions 28A, 46A, these fabric spring members 26, 44 acting as resistance to the airflows that are generated by the air intake devices 38 can be suppressed. Accordingly, in the present embodiment, a rise in the temperatures of the slabs 28, 46 can be suppressed.

Moreover, in the present embodiment, airflows, which flow from the supporting surface 16A side of the seat cushion 16 and the supporting surface 18A side of the seatback 18 toward the sides opposite thereto, can be generated by the air intake devices 38.

By the way, because the body temperature of the vehicle occupant is transmitted to the seatback 18 and the seat cushion 16, there is the tendency for the temperatures thereof to become higher than the temperature of the air within the vehicle cabin. In a case in which the cooling unit is operated or the like, cool air is blown-out from the blow-out port 22 for air conditioning, and this tendency becomes more marked. Accordingly, in cooling the vehicle occupant 14, it is more preferable to use the air within the vehicle cabin than the air that passes-through the seatback 18 or the seat cushion 16.

Here, in the present embodiment, the airflows that are generated at the air intake devices 38 flow from the supporting surface 16A side of the seat cushion 16 and the supporting surface 18A side of the seatback 18 toward the sides opposite thereto. Thus, at the periphery of the vehicle occupant 14, the air that is within the vehicle cabin flows at the vicinity of the vehicle occupant 14 without passing-through the seatback 18 and the seat cushion 16. Accordingly, in the present embodiment, the vehicle occupant 14 can be cooled efficiently by using the air within the vehicle cabin.

In addition, in the present embodiment, the cushion layer 52 has the slab 46 that is provided at the seatback 18 and the slab 28 that is provided at the seat cushion 16, and the airflows can be made to flow toward the back portion, the buttocks, and the femoral regions of the vehicle occupant 14. Therefore, the back portion, the buttocks, and the femoral regions of the vehicle occupant 14 can be cooled by the airflows that are generated by the air intake devices 38.

By the way, nerves are concentrated at the lumbar region of a human body, and it is not preferable for the lumbar region of the vehicle occupant 14 to be cooled excessively by the airflows generated by the air intake devices 38.

Here, in the present embodiment, at the slab 46, the seat upper side portion thereof is structured by the high air permeability portion 46A, and the seat lower side portion thereof is structured by the low air permeability portion 46B. On the other hand, at the slab 28, the seat front side portion thereof is structured by the high air permeability portion 28A, and the seat rear side portion thereof is structured by the low air permeability portion 28B. Therefore, in the present embodiment, the flow volumes of the airflows that flow toward the lumbar region of the vehicle occupant 14 can be made to be small. As a result, the back portion, the buttocks and the femoral regions of the vehicle occupant 14 can be cooled with the vehicle occupant 14 being in a comfortable state.

Second Embodiment

Figure 4:
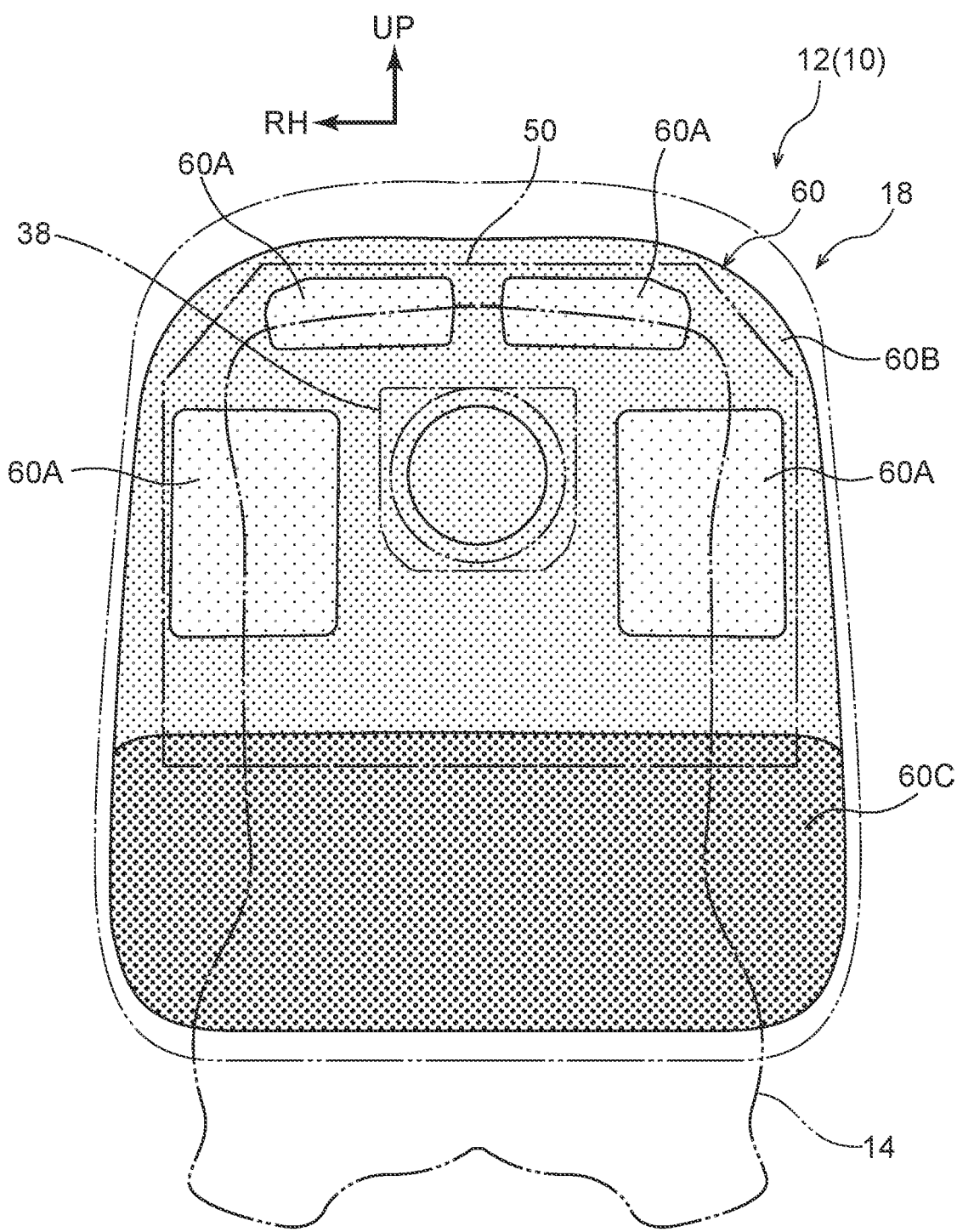
FIG. 4 is a front view that is seen from the seat front-rear direction and shows the structure of a slab that is provided at a seatback side of a vehicle seat relating to a second embodiment.
Figure 5:
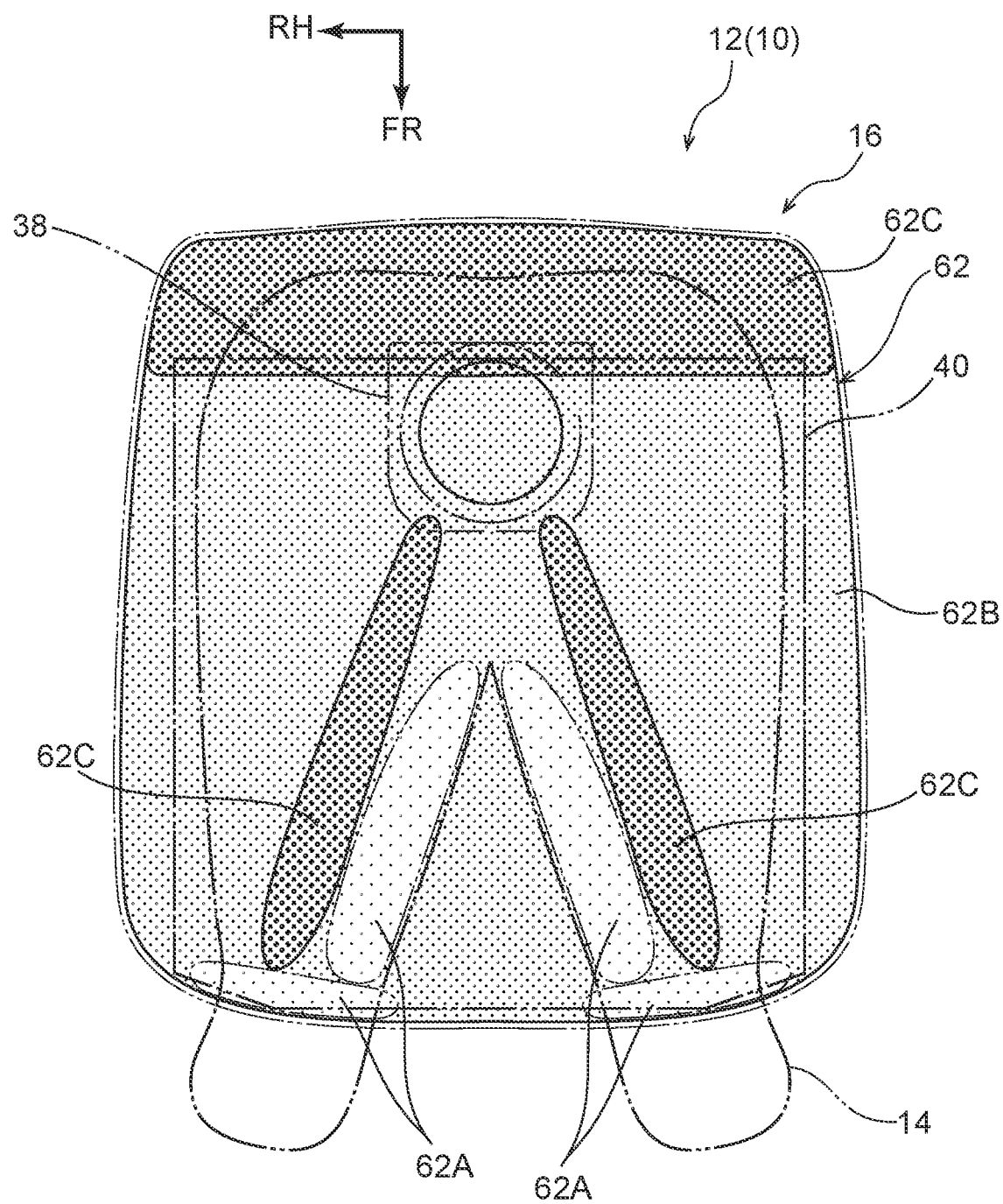
FIG. 5 is a plan view that is seen from the seat vertical direction and shows the structure of a slab that is provided at a seat cushion side of the vehicle seat relating to the second embodiment.

A second embodiment of the vehicle seat relating to the present disclosure is described hereinafter by using FIG. 4 and FIG. 5. Note that structural portions that are the same as those of the above-described first embodiment are denoted by the same reference numerals, and description thereof is omitted.

The present embodiment has a first feature in the point that a "slab 60", which serves as a first cushion layer and is provided at the seatback 18, is structured to include "high air permeability portions 60A", an "intermediate air permeability portion 60B", and a "low air permeability portion 60C". Further, the present embodiment has a second feature in the point that a "slab 62", which serves as a second cushion layer and is provided at the seat cushion 16, is structured to include "high air permeability portions 62A", an "intermediate air permeability portion 62B", and "low air permeability portions 62C".

Concretely, the intermediate air permeability portion 60B that structures the slab 60 is basically structured similarly to the high air permeability portion 46A of the slab 46, and the low air permeability portion 60C that structures the slab 60 is basically structured similarly to the low air permeability portion 46B of the slab 46. On the other hand, the air permeability of the high air permeability portions 60A is set to be higher than that of the intermediate air permeability portion 60B, and, as seen from the seat front-rear direction, the high air permeability portions 60A are positioned at the inner side of the intermediate air permeability portion 60B. In further detail, the high air permeability portions 60A are disposed so as to overlap both shoulders and both armpits of the vehicle occupant 14 as seen from the seat front-rear direction.

On the other hand, the intermediate air permeability portion 62B that structures the slab 62 is basically structured similarly to the high air permeability portion 28A of the slab 28, and the low air permeability portions 62C that structure the slab 62 are basically structured similarly to the low air permeability portion 28B of the slab 28. However, in the present embodiment, the low air permeability portions 62C are disposed at the inner side of the intermediate air permeability portion 62B as seen from the seat vertical direction. In further detail, the low air permeability portions 62C are disposed so as to run along the central portions of the femoral regions where nerves concentrate at the femoral regions of the vehicle occupant 14 as seen from the seat vertical direction.

Further, the air permeability of the high air permeability portions 62A that structure the slab 62 is set to be higher than that of the intermediate air permeability portion 62B, and the high air permeability portions 62A are positioned at the inner side of the intermediate air permeability portion 62B as seen from the seat vertical direction. In further detail, the high air permeability portions 62A are disposed so as to overlap the rears of the knees and the portions at the inner sides of the femoral regions (the inner thighs) as seen from the seat vertical direction. Note that, in the present embodiment, the high air permeability portions 60A, 62A and the intermediate air permeability portions 60B, 62B function as the main air permeable portions, and the low air permeability portions 60C, 62C function as the auxiliary air permeable portions.

In accordance with such a structure, the airflows that pass-through the high air permeability portions 60A, 62A can flow toward places of the vehicle occupant 14 where cooling is effective. Further, cooling of places of the vehicle occupant 14 where cooling is not desirable can be suppressed by the low air permeability portions 60C, 62C. Therefore, in the present embodiment, the flow volumes of the airflows that are directed toward the vehicle occupant 14 can be adjusted suitably in accordance with the region of the body of the vehicle occupant 14, while the comfort of the vehicle occupant 14 is maintained.

Third Embodiment

A third embodiment of the vehicle seat relating to the present disclosure is described hereinafter by using FIG. 6. Note that structural portions that are the same as those of the above-described first embodiment are denoted by the same reference numerals, and description thereof is omitted.

In the present embodiment, portions of the structures of the slabs 28, 46 and the ducts 40, 50 differ from the above-described first embodiment. Note that, because similar changes are made to the slabs 28, 46 and to the ducts 40, 50, concrete description is given hereinafter by using the slab 28 and the duct 40 as examples.

Figure 6:
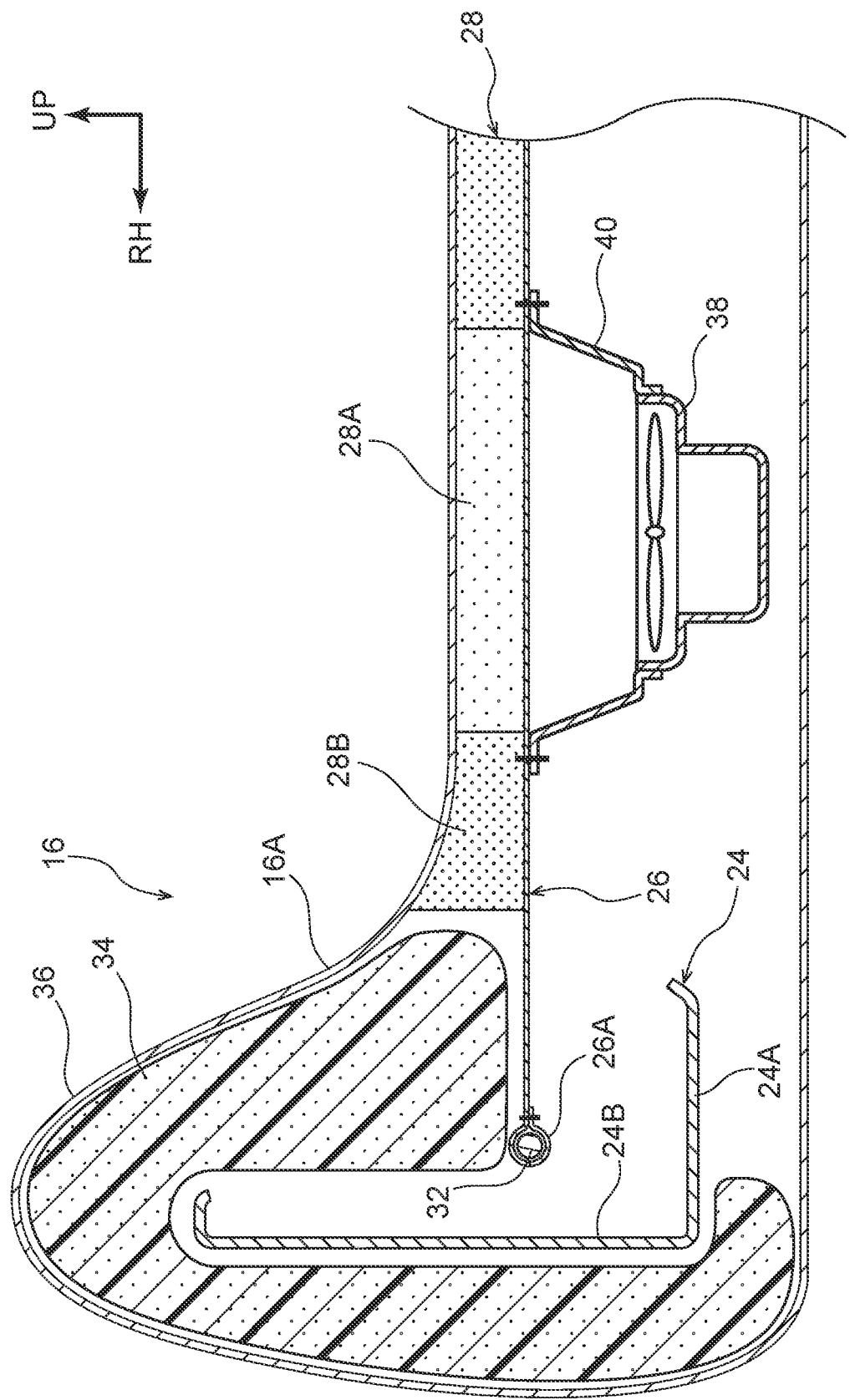
FIG. 6 is a cross-sectional view that is seen from the seat front-rear direction and shows the structure of a seat cushion of a vehicle seat relating to a third embodiment.

As shown in FIG. 6, in the present embodiment, the duct 40 is made to be compact, and the high air permeability portion 28A is disposed at the portion of the slab 28 that overlaps the duct 40 as seen from the seat vertical direction, and the low air permeability portion 28B is disposed at the peripheral portion of this high air permeability portion 28A.

In accordance with such a structure, the air intake device 38 is connected to the slab 28 via the duct 40, and the airflow, which flows from the supporting surface 16A side of the seat cushion 16 toward the air intake device 38, is sucked through duct 40 into the air intake device 38.

By the way, it is thought that, depending on the structure of the slab 28, the high-temperature air that has passed-through the seat cushion 16 will flow toward the vehicle occupant 14. Concretely, there is the example of a case in which, as seen from the supporting surface 16A side of the seat cushion 16, the air permeability of the portion of the slab 28 which portion overlaps the duct 40 is equivalent to or lower than the air permeability of the portion of the slab 28 which portion is at the periphery of the duct 40. In this case, it is thought that the air that has passed-through the seat cushion 16 will circle-around toward the supporting surface 16A side and will be sucked-in to the duct 40 side.

Here, in the present embodiment, as seen from the supporting surface 16A side of the seat cushion 16, the portion of the slab 28 which portion overlaps the duct 40 is structured by the high air permeability portion 28A, and the portion of the slab 28 which portion is at the periphery of the high air permeability portion 28A is structured by the low air permeability portion 28B. Therefore, in the present embodiment, it is easy for the air within the vehicle cabin to be sucked-in from the duct 40, and air at the interior of the seat cushion 16 being sucked into the duct can be suppressed. Accordingly, in the present embodiment, the reliability of low-temperature air flowing toward the vehicle occupant 14 can be improved.

Fourth Embodiment

A fourth embodiment of the vehicle seat relating to the present disclosure is described hereinafter by using FIG. 7. Note that structural portions that are the same as those of the above-described third embodiment are denoted by the same reference numerals, and description thereof is omitted.

In the present embodiment, main portions are structured similarly at the seat cushion 16 side and the seatback 18 side, and therefore, the structure of the seat cushion 16 side is described hereinafter. As shown in FIG. 7, in the present embodiment, the fabric spring member 26 is not provided at the seat cushion 16, and there is provided a cushion portion 70 that includes a "cushion layer 70A" that corresponds to the slab 28 and pad portions 70B that correspond to the seat pads 34.

This cushion portion 70 is structured by a urethane foam that has been subjected to a film removing treatment (as an example, BREATHAIR®). Note that film removing treatment here means a treatment that makes it easy for air and water to pass-through by removing the thin film that structures portions of the voids of the urethane foam. Further, in the same way as in the third embodiment, a "high air permeability portion 70A1" that serves as a main air permeable portion and a "low air permeability portion 70A2" that serves as an auxiliary air permeable portion are disposed at the cushion layer 70A. Note that, at the boundary portion of the high air permeability portion 70A1 and the low air permeability portion 70A2, the high air permeability portion 70A1 is disposed at the seat upper side. Further, the pad portions 70B are structured of a material similar to that of the low air permeability portion 70A2.

In accordance with such a structure, the cushion layer 70A is structured by a urethane foam that has been subjected to a film removing treatment, and the vehicle occupant 14 can be supported by the cushion layer 70A, and storage of heat at the cushion layer 70A can be suppressed. Therefore, in the present embodiment, a rise in temperature of the cushion layer 70A can be suppressed while an increase in the number of parts is suppressed.

Supplemental Description of Above-Described Embodiment (1) In the above-described embodiment, the seat cushion 16 and the seatback 18 respectively are structured such that the airflows flow toward the vehicle occupant 14, but either one only may be structured such that the airflow flows toward the vehicle occupant 14.

(2) Further, although the air intake devices 38 are used in the above-described embodiment, there may be a structure in which air blowing devices are disposed in place of the air intake devices 38, and airflows are blown-out toward the vehicle occupant 14 from the supporting surface 16A side of the seat cushion 16 and the supporting surface 18A side of the seatback 18.

(3) Moreover, although the air intake devices 38 are disposed at the seat cushion 16 and the seatback 18 respectively in the above-described embodiment, the present disclosure is not limited to this. As an example, there may be a structure in which the air intake device 38 is disposed only at the seat cushion 16, and the exhaust side of the air intake device 38 of the seat cushion 16 is connected to the duct 50 of the seatback 18. In accordance with such a structure, the airflow is blown-out from the supporting surface 18A side at the seatback 18 toward the vehicle occupant 14, and airflows can be generated at both the seat cushion 16 and the seatback 18 by using the one air intake device 38.

What is claimed is:

1. A vehicle seat comprising:
a seatback that supports a back portion of a vehicle occupant;
a seat cushion that supports buttocks and femoral regions of the vehicle occupant;
a first airflow generating device that is disposed at an interior of the seat cushion, the airflow generating device being configured to:
generate a difference in pressure between a supporting surface side that supports the vehicle occupant, and a side opposite the supporting surface, and
generate an airflow; and
a first cushion layer that is provided at the seat cushion, the first cushion layer defining a portion of the supporting surface side at the side of the seat cushion, the first cushion layer including:
a seat front side portion that defines a first main air permeable portion that is set to a predetermined void ratio and through which a majority of the airflow generated by the airflow generating device passes; and
a seat rear side portion that defines a first auxiliary air permeable portion that is set to a void ratio that is lower than that of the first main air permeable portion and the first auxiliary air permeable portion has an air permeability that is lower than that of the first main air permeable portion,
wherein the first auxiliary air permeable portion is entirely to a rear of the first main air permeable portion.

2. The vehicle seat of claim 1, wherein:
the first cushion layer is supported by a fabric spring member that spans between a pair of frame members that structure portions of a frame at a side at which the cushion layer is provided, of the seatback or the seat cushion; and
the fabric spring member has air permeability that is equivalent to, or higher than, that of the first main air permeable portion.

3. The vehicle seat of claim 1, wherein the first cushion layer is structured by a urethane foam that can support the vehicle occupant and that has been subjected to a film removing treatment.

4. The vehicle seat of claim 1, wherein the first airflow generating device is an air intake device that draws air in from the supporting surface side to the side opposite the supporting surface.

5. The vehicle seat of claim 1, further comprising:
a second airflow generating device that is disposed at an interior of the seatback;
a second cushion layer that is provided at the seatback and that structures a portion of the supporting surface side at the side of the seatback, wherein:
a seat upper side portion of the second cushion layer that is structured by a second main air permeable portion, and a seat lower side portion of the second cushion layer is structured by a second auxiliary air permeable portion.

6. The vehicle seat of claim 4, wherein the air intake device is connected to the first cushion layer via a duct, and, as seen from the supporting surface side, a portion of the first cushion layer that overlaps the duct is structured by the first main air permeable portion, and a portion that is at the periphery of the main air permeable portion is structured by the auxiliary air permeable portion.

7. A vehicle seat comprising:
a seatback that supports a back portion of a vehicle occupant;
a seat cushion that supports buttocks and femoral regions of the vehicle occupant;
an airflow generating device that is disposed at an interior of at least one of the seatback or the seat cushion, that the airflow generating device being configured to:
generate a difference in pressure between a supporting surface side that supports the vehicle occupant, and a side opposite the supporting surface; and
generate an airflow; and
a cushion layer that is provided in the seatback or the seat cushion and at a side at which the airflow generating device is disposed, that the cushion layer defining a portion of the supporting surface side at the side at which the airflow generating device is disposed, the cushion layer including:
a main air permeable portion that is set to a predetermined void ratio and through which a majority of the airflow generated by the airflow generating device passes; and
an auxiliary air permeable portion, which is set to a void ratio that is lower than that of the main air permeable portion and whose air permeability is lower than that of the main air permeable portion, wherein:
the cushion layer is a single layer that is directly supported by a fabric spring member that extends between a pair of frame members that structure portions of a frame at a side of the seatback or the seat cushion at which the cushion layer is provided, and
the fabric spring member has air permeability that is equivalent to, or higher than, that of the main air permeable portion.

8. The vehicle seat of claim 7, wherein the cushion layer is structured by a urethane foam that can support the vehicle occupant and that has been subjected to a film removing treatment.

\* \* \* \* \*